Figure 1:
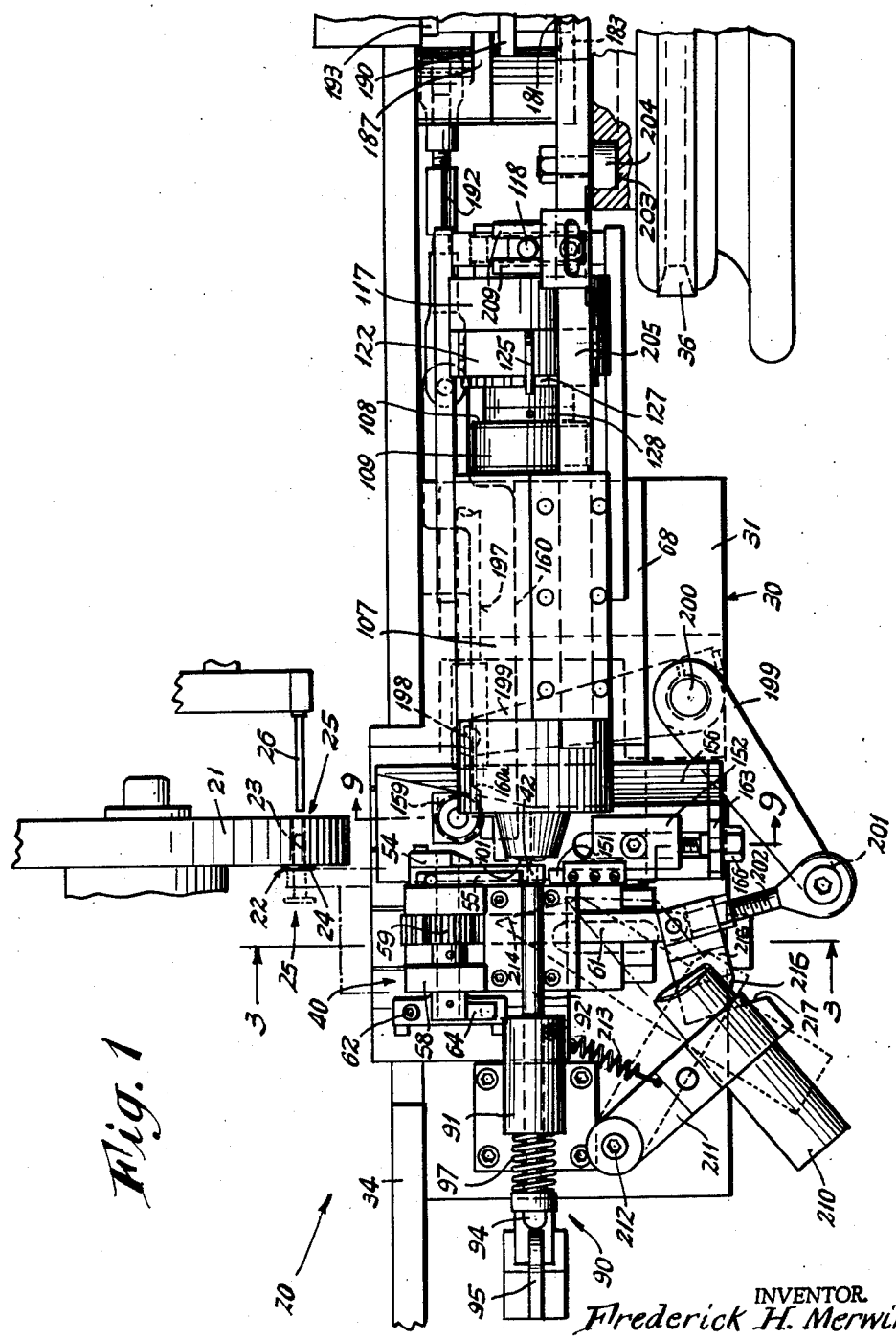

June 8, 1965    F. H. MERWIN    3,187,908
WORKPIECE HEAD WORKING MACHINE
Filed Aug. 2, 1962    5 Sheets-Sheet 1

INVENTOR.
Frederick H. Merwin
BY
Johnson and Kline
ATTORNEYS

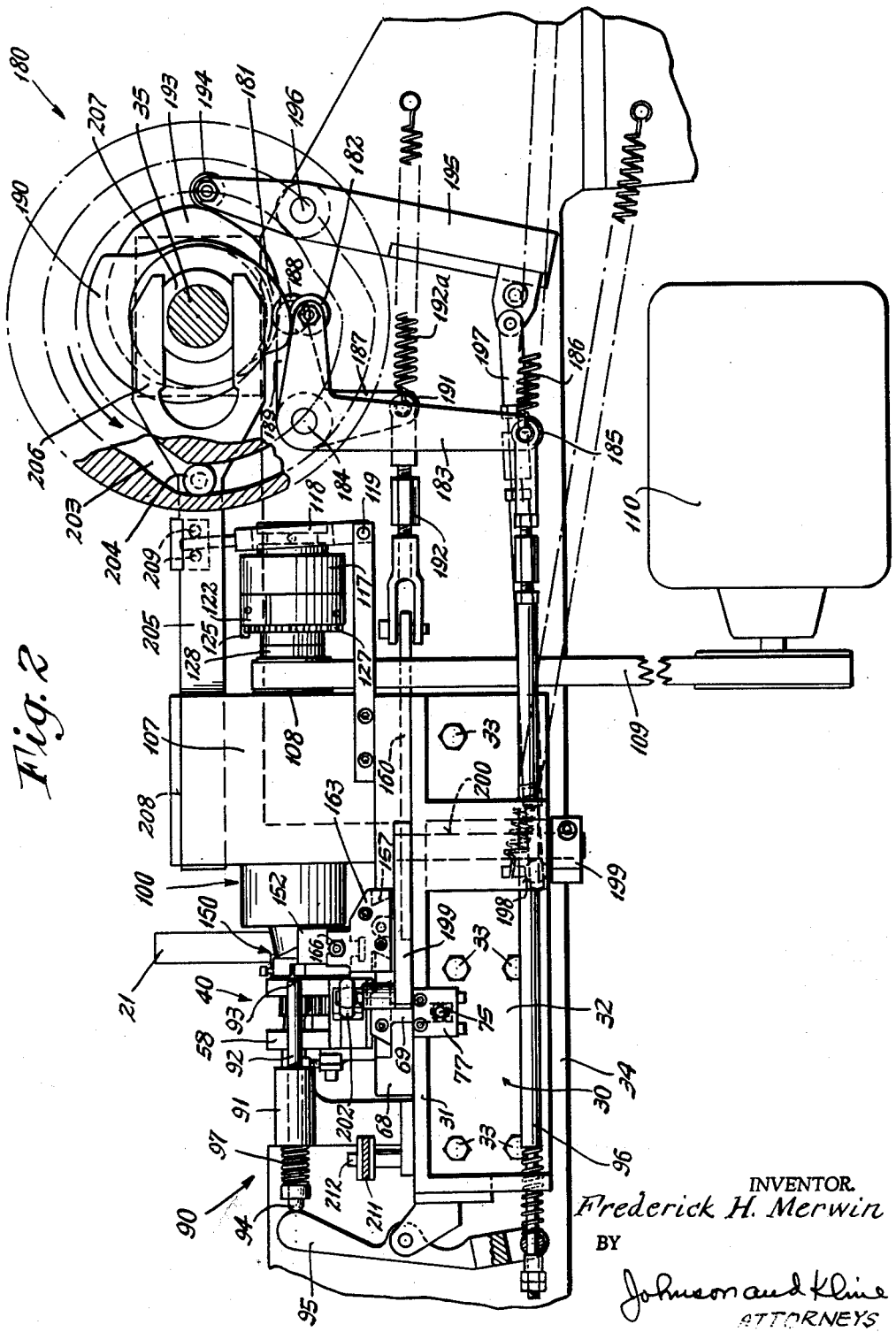

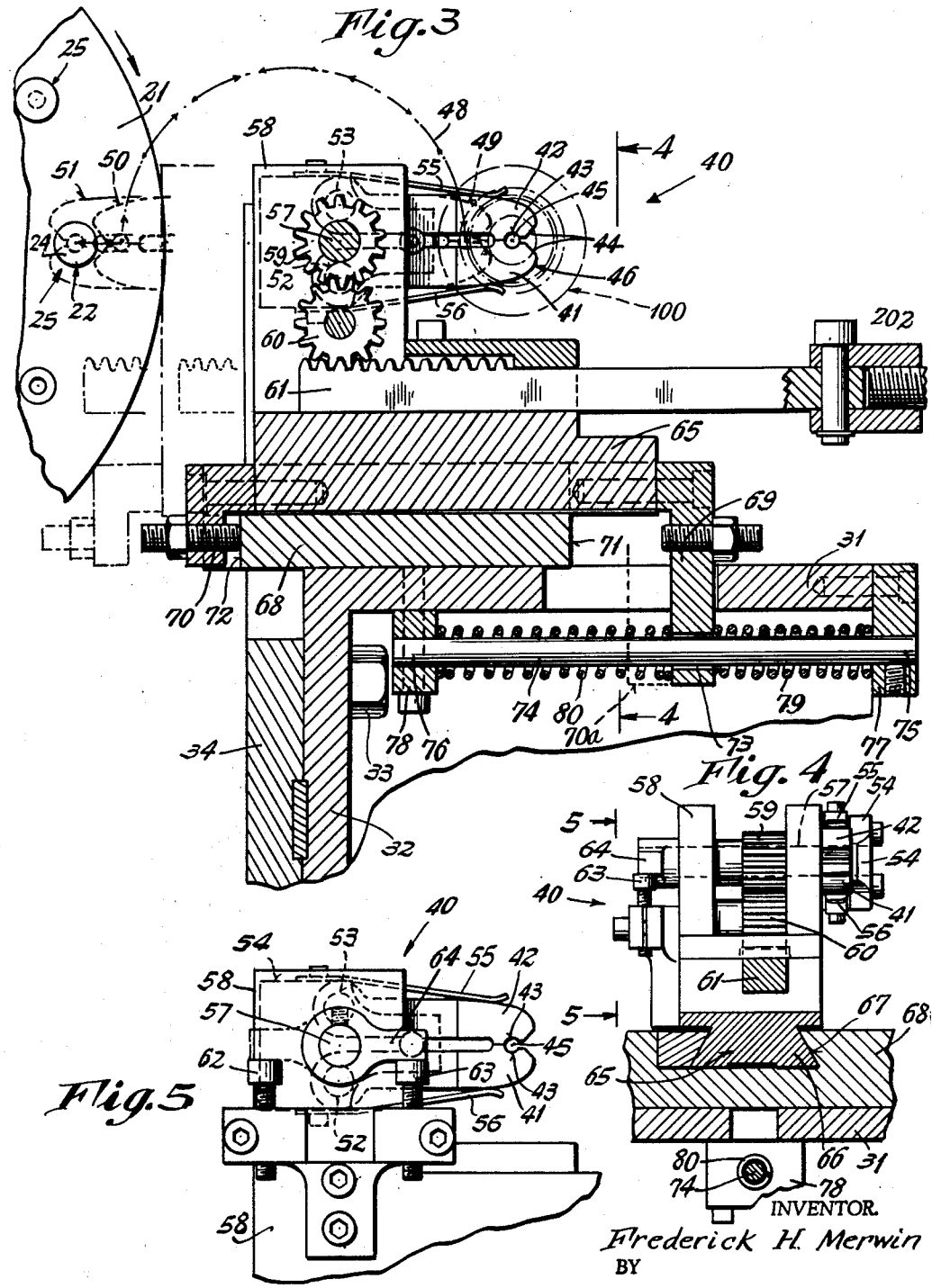

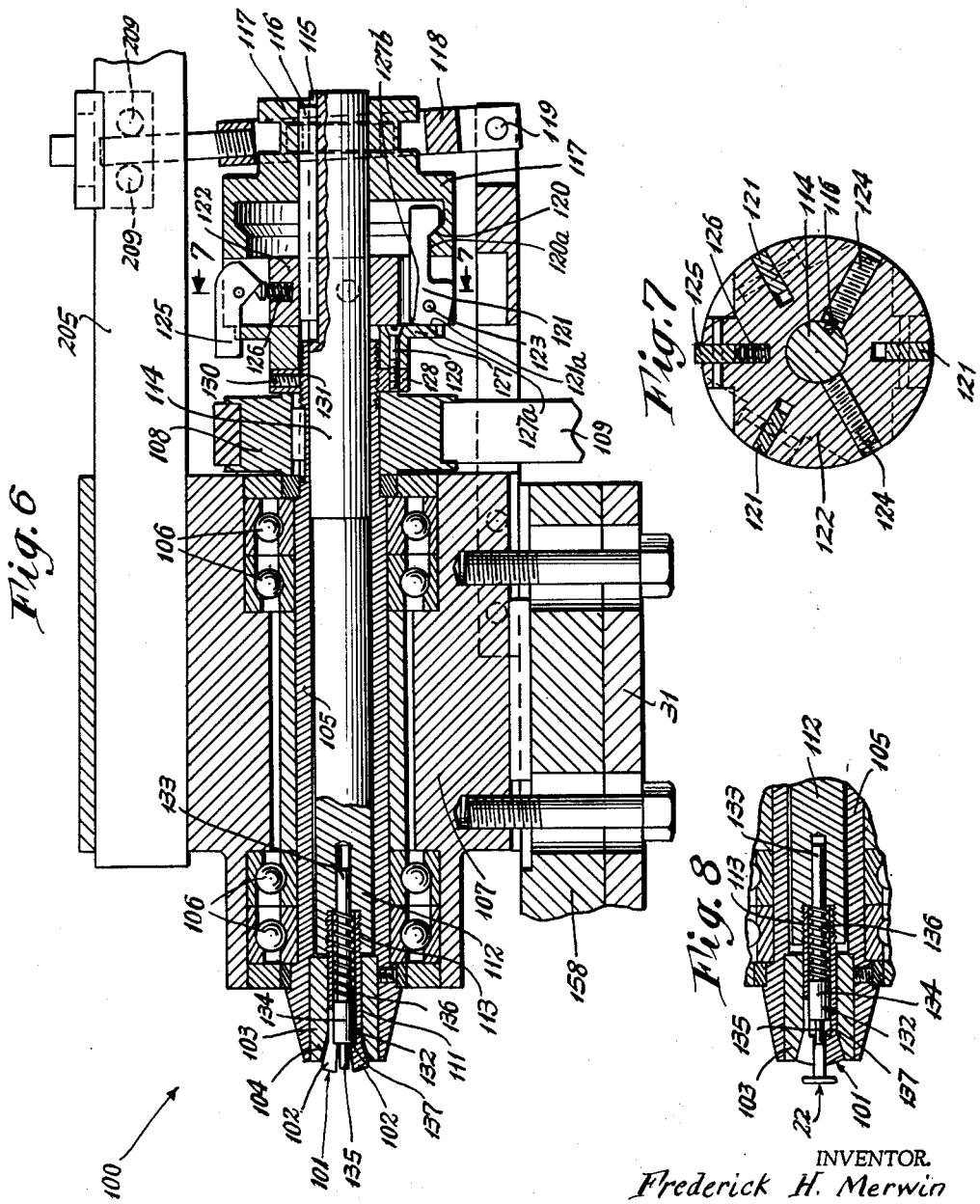

June 8, 1965    F. H. MERWIN    3,187,908
WORKPIECE HEAD WORKING MACHINE
Filed Aug. 2, 1962    5 Sheets-Sheet 5
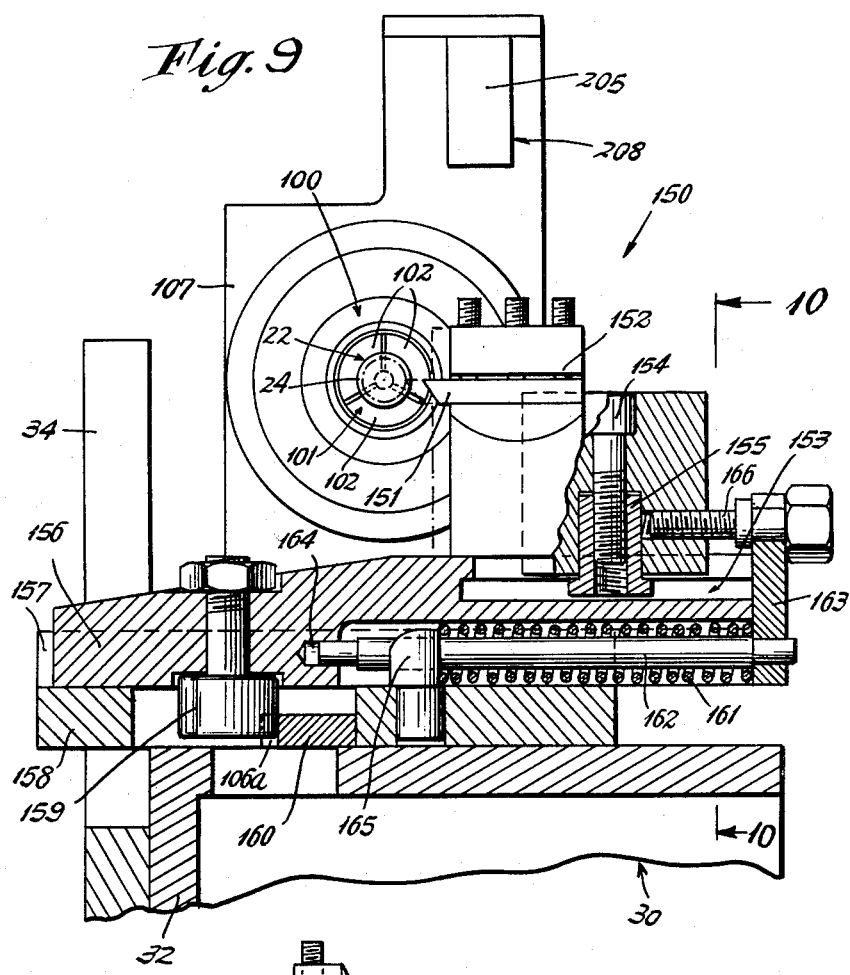
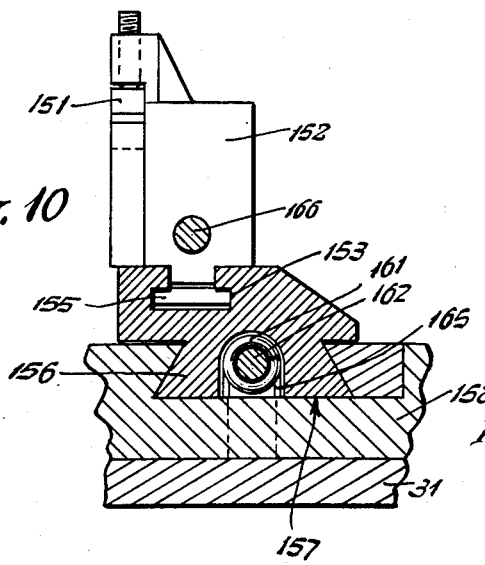
INVENTOR.
Frederick H. Merwin
BY
Johnson and Kline
ATTORNEYS

United States Patent Office 3,187,908
Patented June 8, 1965

3,187,908
WORKPIECE HEAD WORKING MACHINE
Frederick H. Merwin, Milford, Conn., assignor to The Milford Rivet & Machine Co., Milford, Conn., a corporation of Connecticut
Filed Aug. 2, 1962, Ser. No. 214,253
7 Claims. (Cl. 214—1)

The present invention relates to a machine that performs operations on the head of a workpiece that has a shank terminating in a head, such as a rivet, and more particularly to such a machine which may be attached to a machine which has performed previous operations on the workpieces.

In U.S. Patent No. 3,030,827, granted to the present inventor, there is shown, particularly in FIGS. 1 through 16, a dial drilling machine for operating on headed workpieces of the above-noted type which includes a dial mechanism having a plurality of carrying positions, each of which supports a workpiece. The workpieces are maintained stationary in the dial mechanism and the dial mechanism is indexed to work stations where powered tools perform operations on the workpieces, such as drilling the axial hole in a rivet. However, such a machine has been heretofore incapable of performing operations on the head of the workpieces, as for example, turning the head to a particular size or shape and hence in the manufacture of the workpieces these head operations were required to be performed on separate machines or else by not being capable of being performed on a dial machine such a workpiece could not be made on the dial drilling machine.

It is accordingly an object of the present invention to provide a machine which may be easily attached to a dial drilling machine to take a workpiece as it is ejected from the dial machine after having operations performed thereon and to perform subsequent operations on the head of each workpiece and then eject the finished workpiece.

Another object of the present invention is to provide in such a workpiece head working machine for causing the workpiece to be accurately positioned in the machine and to be moved relative to an operating tool whereby the relative movement enables the operation to be performed.

A further object of the present invention is to provide a machine for operating on the heads of workpieces which is reliable in use, relatively economical to manufacture and may be easily attached to a dial drilling machine.

In carrying out the present invention, the machine for working on the heads of workpieces includes a transfer mechanism which, when the machine of the present invention is attached to a dial drilling machine, grasps the workpiece after operations by the dial machine have been performed thereon and the workpiece is being ejected from the dial machine and transfers the workpiece to the head working machine. The workpiece is accurately positioned in a rotatable collet and work performing tools are moved against the moving workpiece to perform the desired operation. After the operation has been completed, the workpiece is automatically ejected from the machine to be guided to a collecting station for completed workpieces and a subsequent workpiece is then positioned in the collet. By operating both the machine of the present invention and the dial drilling machine in unison, each workpiece that is ejected from the dial machine is grasped and worked upon by the head working machine.

Other features and advantages will hereinafter appear.
In the drawing:
FIGURE 1 is a plan of the machine of the present invention together with details of the dial and ejector pin of a dial drilling machine to show the relative positions thereof.
FIG. 2 is a side view thereof, partly in section.
FIG. 3 is a section taken on the line 3—3 of FIG. 1, showing details of the transfer mechanism.
FIG. 4 is a detail, partly in section, taken on the line 4—4 of FIG. 3.
FIG. 5 is an end view taken in the direction of the arrows 5—5 of FIG. 4.
FIG. 6 is a section of the workpiece holding and rotating mechanism.
FIG. 7 is a section taken on the line 7—7 of FIG. 6.
FIG. 8 is a section showing the position of the parts of the workpiece holding and rotating mechanism when a workpiece is being held thereby.
FIG. 9 is a section taken on the line 9—9 of FIG. 1, showing details of the work performing tool mechanism.
FIG. 10 is a detail section taken on the line 10—10 of FIG. 9.

The head working machine of the present invention is generally indicated by the reference numeral 20 and while it may be employed as a separate machine is most advantageously attached to a dial drilling machine, disclosed in the above-noted U.S. patent in FIGS. 1 through 16 thereof, and which includes a dial 21 which is indexable around work stations on the dial machine. The dial 21 stationarily holds workpieces 22 by their shank 23 with the head 24 being exposed in a work station 25. For removing the workpiece from the work station 25, there is provided an ejector pin 26 that engages the end of the shank of the workpiece and forces it axially out of the dial work station 25 after operations have been performed on the workpiece, as disclosed in said patent.

The machine of the present invention includes an elongate relatively L-shaped in cross-section frame 30 having a horizontal leg 31 and a vertical leg 32 secured as by bolts 33 to a vertical side 34 of the dial drilling machine. For providing power to the head working machine and also for correlating the dial drilling machine with the machine, there is provided a shaft 35 that is common to both the machine and the dial drilling machine and which is powered by a belt 36 connectible to any suitable rotational device such as an electric motor, not shown, to thereby power both the machine and the dial drilling machine and drive them in timed relation to each other.

*Transfer mechanism*

The transfer mechanism, generally indicated by the reference numeral 40 grasps the workpiece 22 after the ejector pin 26 has initially slightly displaced the workpiece from the work station 25 of the dial 21 by the exposed shank portion below the head and maintains its hold on the shank while permitting the workpiece to be moved axially in the transfer mechanism by the ejector pin to thereby completely free the workpiece from the dial work station 25. The transfer mechanism 40 as particularly shown in FIG. 3 includes a pair of jaws 41 and 42 with each formed to provide a semi-circular cutout 43 and inclined entrance 44 to the cutouts with the cutouts defining a substantially circular aperture 45. The jaws are mounted to effect movement of the axis of the aperture 45 from the full line position 46 along the dotted line 47, following the direction of the arrows 48, linearly to the dotted line position 49, pivotally to the dotted line position 50, linearly to the dotted line position 51, reversely linearly substantially to the dotted line position 50, reversely pivotally to substantially the dotted line position 49 and then linearly to the full line position 46 for each workpiece transferred. The jaws 41 and 42 are pivotally mounted on headed pivot pins 52 and 53 respectively on an end plate 54 and are urged together by flat springs 55 and 56 respectively.

The end plate 54 is secured on a shaft 57 that is rotatably mounted in the legs of a U-shaped bracket 58. The shaft 57 carries a gear 59 mating with a pinion gear 60 also rotatably mounted on the bracket 58 and the gear 60 cooperates with a gear rack 61. Thus longitudinal movement of gear rack 61 will impart pivotal movement through the parts 60, 59, shaft 57 and end plate 54 to the jaws 41 and 42. For limiting rotational movement of the jaws, the bracket carries a pair of adjustable stops 62 and 63 which are engageable by a lug 64 secured on the shaft 57 on the other side of the bracket 58 from the jaws 41 and 42. It will be appreciated that the jaws may pivot on the pins 52 and 53 to permit the shank of a workpiece to be inserted therebetween and the movement is resisted by the springs 55 and 56.

In order to effect the linear movement of the jaws, the U-shaped bracket 58 has a sliding base 65 provided with a tongue 66 that mates with a dovetail groove 67 formed in a plate 68 fastened on the horizontal leg 31. Depending from the bracket 58 at each end thereof are a pair of adjustable abutments 69 and 70 that are engageable with the ends 71 and 72 respectively of the plate 68 to accurately limit the longitudinal movement of the bracket. The abutment 69 includes an aperture 73 through which passes a rod 74 with the ends 75 and 76 of the rod being made fast to the frame by members 77 and 78 respectively. The rod 74 is encompassed by a tension spring 79 with one end of the spring abutting the member 77 and its other end bearing against the abutment 69 while another spring 80 also has an end that bears against the abutment 69 with its other end engaging the member 78. The springs 79 and 80 are compression springs and tend to resist movement of the abutment and hence the bracket and jaws from the normal position, indicated by the reference numeral 70a of the abutment 70, and if so moved, tend to restore the abutment to its normal position.

It will be appreciated that at the full line position shown, the spring 79 is compressed and movement of the gear rack 61 will enable the spring to become uncompressed by letting the base move longitudinally to the normal position of the abutment 70a which is also the position 49 of the jaws. At this position the spring 80 resists compression and further movement of the gear rack causes pivotal movement of the jaws until the lug 64 engages stop 62 which places the jaws in the dotted line position 50. Subsequent movement of the gear rack effects linear movement of the jaws to the position 51 with compression of the spring 80. Upon reversal of movement of the gear rack, the spring 80 causes linear movement of the jaws until the normal position 70a of the abutment is substantially achieved wherein pivotal movement of the jaws occurs to the position 49 when the lug hits the stop 63. Subsequent movement of the jaws is linear and effects compression of the spring 79 until the full line position 46 is reached wherein the gear rack reverses direction of movement to repeat the cycle.

*Inserting mechanism*

In the full line position of the jaws shown in FIG. 3, wherein the shank of the workpiece 22 is positioned in the jaws, the workpiece is caused to move axially in the jaws in order to accurately position the head of the workpiece in a workpiece driving mechanism 100 hereinafter described, by an inserting mechanism 90. As shown in FIGS. 1 and 2, a bushing 91 slidably supports an inserting rod 92 having an end 93 that engages the head of the workpiece to move it axially. The other end 94 of the inserting rod is engaged by a pivoted lever 95 which in turn is connected to a link 96 whose movement effects the accurate longitudinal movement of the inserting rod to properly position the workpiece. A spring 97 encircles the inserting rod and normally urges it away from the head of the workpiece to thus maintain contact between the lever and the inserting rod.

*Workpiece driving mechanism*

The workpiece driving mechanism 100 is shown in section in FIG. 6 and includes a collet 101 shown in this figure in position to receive the shank of the workpiece and, as shown in FIG. 8, to hold it and rotate it.

The collet is substantially tubular having resilient outwardly biasing work-engaging fingers 102 that are adapted to be compressed inwardly upon axial movement of the collet with respect to a spindle nut 103 by engagement of the exterior of the fingers with a camming surface 104 formed on the spindle nut 103. The spindle nut 103 is secured to a spindle bearing 105 that is rotatably supported by roller bearings 106 secured in a support 107 mounted on the horizontal leg 31. A pulley 108 is secured on the spindle bearing and is connected as by a belt 109 to a motor 110 so that rotation of the motor effects rotation of the spindle bearing and the spindle nut.

The spindle nut includes an aperture 111 for supporting the collet while the other end of the collet is threaded for securement to a spindle drawbar 112 that is mounted for axial movement within the spindle bearing 105 to enable the collet to be axially moved while being rotated. Axial movement of the collet provides for the workpiece receiving position shown in FIG. 6, wherein a workpiece may be inserted, and the workpiece grasping position shown in FIG. 8 of the collet. After work is performed on the head of the workpiece the collet is moved back to the position shown in FIG. 6, wherein the rivet is ejected in a manner which will be hereinafter explained. In order to provide for the above-noted movement of the collet, the spindle drawbar 112 has a threaded aperture 113, into which the collet is threaded at one end. Its other end portion has a bearing surface 114 by which the spindle drawbar is supported by the spindle bearing 105. A keyway 115 in which a key 116 is positioned is employed to slidably support yet prevent relative rotation with a collar 117 that is engaged by a yoke 118 pivoted as at 119. The collar has camming surfaces 120 and 120a engageable by a plurality of fingers 121 pivotally carried by an annular disk 122 on pivots 123. The annular disk 122 is secured as by set screws 124 to the spindle drawbar and carries a pivoted latch 125, spring urged as by spring 126 into one of the notches formed in a notched wheel 127. The notched wheel 127 is secured to a nut 128 by a screw 129 with the nut in turn being threaded on and made fast, by set screw 130, to a threaded portion 131 of the spindle bearing.

With this structure it will be understood that the above parts except for the yoke 118 and pivot 119 rotate with the spindle bearing. The camming surfaces 120 and 120a and fingers 121 minimize wear between the collar and the yoke as the collar is maintained in either the position shown in FIG. 6 or FIG. 8 by the fingers engaging the surface 120 or the surface 120a. In the former position each flat edge 121a of the fingers bears against the radial surface 127a of the notched wheel as shown in FIG. 6 while in the latter position the corner 121b of each finger bears against the surface 127a. As the corner 127b is further away from the pivot 123 than the edge 121a, when a finger is pivoted so that the corner 121b bears against the surface 127a, it forces the notched wheel and disk 122 apart which causes the spindle drawbar to move into the spindle bearing. Thus in both positions the necessity of the yoke maintaining a force against the collar to hold the collar in either position is thereby eliminated. The disk 122, notched wheel 127, latch 125 and nut 128 provide for axial movement of the spindle drawbar with respect to the spindle bearing to thereby control the effect of the camming surface 104 on the collet. This has been found decidedly advantageous as it permits controlling the gripping effect of the collet on the workpiece which may be adjusted for different workpieces, i.e. thin wall tubular and solid shanks and also enables compensation for wear of the collet.

The workpiece is ejected from the collet 101 by an ejector plunger 132 having an end 133 mounted in the spindle drawbar, an enlarged intermediate portion 134 and an outer end 135 that is axially aligned with the collet and is engageable with the end of the shank of a workpiece in the collet. A spring 136 abuts the portion 134 and the spindle drawbar to urge the plunger outwardly while the collet has a radial flat 137 that limits outward movement of the plunger.

Working performing tool mechanism

The work performing tool mechanism 150 in the specific embodiment of the invention shown wherein it is desired to cut the head of the workpiece to a desired diameter includes a cutting tool 151 mounted in a cutting tool bit holder 152 that is clamped in a sled 153 by a screw 154 and bolt 155. The sled 153 has a base 156 that is mounted for adjustable sliding movement in a dovetail groove 157 formed in support 158 that is made fast in the horizontal leg 31. Secured to the base 156 is a cam follower 159 that cooperates with a cam 160 in a manner hereinafter explained while a spring 161, encircling a rod 162, urges the cam follower against the cam. The rod has one end that is fast in a lug 163 that forms part of the base and its other end is positioned in an aperture 164 also formed in the base. The spring 161 has one end that bears against the lug 163 while its other end bears against a post 165 that encircles the rod and is made fast in the support 158. For enabling adjustable positioning of the base 153 with respect to the support 158, the lug 163 carries a bolt 166 which by rotation thereof effects sliding movement of the base on the support for positioning thereof.

Driving mechanism

The transfer mechanism, inserting mechanism, workpiece driving mechanism and the work performing tool mechanism have their operations controlled by a driving mechanism 180 that includes a plurality of cams mounted on the shaft 35. Cam 181 which controls the inserter mechanism has a follower 182 mounted on an elbow crank 183 pivoted to the frame as at 184 with the other end 185 of the crank being pivotally connected to the adjustable length link 96 of the inserter mechanism. A spring 186 is connected to the other end 185 of the crank and the frame to maintain the follower 182 against the cam 181.

For operating the work performing tool mechanism 150 there is provided an elbow crank 187 having a follower 188 at one end 189 bearing against the surface of a cam 190 and pivoted on the frame as at 184. The other end 191 of the crank 187 is connected to an adjustable length linkage 192 that is in turn connected to the slide cam 161 and serves to move the cam longitudinally. A spring 192a connected to the other end 191 of the crank 187 and the frame maintains the follower 188 against the cam 190.

The transfer mechanism 40 is driven in timed relation to the other mechanism by a cam 193 which has a cam follower 194 mounted on a link 195 pivoted to the frame as at 196 and to which is connected an adjustable length link 197. The link 197 is pivoted to one end 198 (FIG. 1) of an elbow crank 199 having a pivot pin 200 while its other end 201 is connected through an eye bolt 202 to the gear rack 61 to provide the reciprocating longitudinal movement of the gear rack. For reciprocating the spindle drawbar 112 there is provided a grooved cam 203 that drives a follower 204 mounted on a slide 205 that has a yoke end portion 206 supported by a flattened bushing 207 on the shaft 35. The other end portion of the slide 205 is supported in a slideway 208 formed in the frame. The slide includes a pair of abutments 209 which contain the end of the yoke 118 to control movement of the yoke.

In order to guide the workpiece away from the collet 101 after the completion of the work on the workpiece, there is provided a guide tube 210 supported by a strap 211 that is pivotally mounted as at 212 on the frame and spring urged as by spring 213 to the dotted line position shown in FIG. 1 wherein the tube entrance 214 is adapted to receive a workpiece ejected from the collet 101. For controlling movement of the ejector tube, a cam plate 215 is mounted on the eye bolt 203 and has a camming surface 216 which engages a camming surface 217 formed on the strap 211. While the spring 213 urges the tube to its dotted line position, however, its movement is controlled by the two camming surfaces 216 and 217 and thus is operated in timed relation to the transfer mechanism 40.

Operation

In the operation of the machine of the present invention the cam 193 causes the crank 199 to pivot clockwise which through the eye bolt 202 forces the gear rack 61 leftward in FIG. 3. As previously explained, this effects a linear movement of the jaws to the position 49 by the sliding movement of the sliding base 65. While a workpiece is being held by the jaws at the full line position 46, its shank is also being held by the collet 101 and hence the linear movement of the jaws forces the jaws to separate only slightly to permit the shank of the workpiece to be released from the jaws. The jaws are now in the dotted line position 49 and subsequent movement of the gear rack causes pivotal movement of the jaws to the dotted position 50 wherein the lug 64 engages the stop 62 and prevents further pivotal movement of the jaws. Subsequent leftward longitudinal movement of the gear rack 61 is translated into longitudinal movement of the sliding base to position the jaws in the dotted line position 51 wherein the jaws have been separated by the inclined entrances 44 of the jaws being forced against the shank of a workpiece and hence the jaws will snap over the shank of the workpiece 22 that has been partially ejected from the dial work station 25 by the ejector pin 26 to expose a portion of the shank. Upon grasping the workpiece, the ejector pin continues to force the workpiece from the work station 25 causing sliding movement to occur relative to the workpiece and the jaws but the jaws still maintaining their grasp on the shank of the workpiece as it is moved. After the ejector pin has sufficiently moved the workpiece from the dial station so it is free thereof, the gear rack 61 is reversely longitudinally moved and the jaws are linearly moved to the dotted line position 50 and then pivotally to the position 49 wherein the lug 64 engages the stop 63 and prevents further pivotal movement of the jaws. Subsequent movement of the gear rack effects longitudinal movement of the sliding base to position the jaws carrying the workpiece at their full line position shown in FIG. 3. Upon achieving this position, wherein the shank of the workpiece is aligned with the collet 101, the cam 181 operates the link 96 to force the inserter pin rightwardly in FIG. 2 where its end 93 engages the head of the workpiece and moves it axially in the jaws of the collet against the force of the outwardly urged ejector plunger 132. The spindle drawbar is urged to the workpiece grasping position shown in FIG. 8 by the slide 205 being moved to the right (FIG. 2) pivoting the yoke 118 clockwise and moving the collar 117 axially on the spindle drawbar. This causes the fingers 121 to slide onto the camming surface 120a of the collar to pull the spindle drawbar rightwardly in FIG. 6 so that the collet fingers 102 engage the camming surface 104 of the spindle nut 103 compressing them to thereby effect the grasping of the shank of the workpiece by the collet as shown in FIG. 8. Moreover, it will be appreciated that the head of the rivet has been accurately positioned with respect to the collet by the controlled movement of the inserter pin. The motor 110 through belt 109 drives the spindle drawbar and spindle bearing continually and hence rotates the workpiece. After the workpiece has been positioned in the collet and grasped thereby, the inserter pin returns to its normal position and the jaws of the transfer mechanism begin the next cycle for picking up a subsequent workpiece from the dial by movement to the dotted line position 49. With the workpiece grasped and being rotated by the collet, the cutting tool 151 is moved against the head of the workpiece a predetermined distance to size the diameter of the head of the workpiece by the reciprocating movement of the cutter cam 160 which has a step 160a that engages the cam follower 159 to force the cutter base 156 leftwardly in FIG. 9 against action of the spring 161. Upon reciprocating movement of the cam 160, in the opposite direction, the spring effects return movement of the cutter to the full line position shown in FIG. 9.

It will be appreciated that by the time in the cycle of the operation on the workpiece in which the cutter has completed its operation and return to its full line position, the cam 193 has positioned the jaws 41 and 42 in the neighborhood of the dotted line position 50 which enables the ejector tube 210 to be forced to assume its dotted line position, shown in FIG. 1, by the spring 213. The slide 205 is then moved leftwardly (FIG. 2) to effect the shifting of the fingers 121 to the full line releasing position on the camming surface 120 which releases the grasp of the collet fingers 102 on the shank of the workpiece and enables the ejector plunger 132 to force the workpiece from the collet into the entrance 214 of the ejector tube. The transfer mechanism is now approaching the dotted line position 51 of the jaws to repeat the cycle on a subsequent workpiece.

The term "shank" as used herein refers to that part of the workpiece that is positioned within the collet while the term "head" is that part of the workpiece that protrudes from the collet.

It will accordingly be appreciated that there has been disclosed a machine for performing an operation on the head of a workpiece which requires that the workpiece be accurately positioned and rotated. The machine is preferably and advantageously employed as an attachment to a dial drilling machine wherein the attachment and the dial drilling machine are driven in unison so that the attachment is capable of grasping each workpiece as it is ejected from the dial drilling machine after operations have been performed thereon and perform its own head working operation. Moreover, the machine of the present invention provides for performing operations on a workpiece which heretofore have not been capable of being performed on a dial drilling machine as it enables tools to work on the head of the workpiece with the head being capable of being accurately positioned and exposed with respect to the tools.

Variations and modifications may be made within the scope of the claims and portions of the improvements may be used without others.

I claim:

1. A transferring mechanism for a work piece comprising jaw means adapted to grasp and release a workpiece, support means for supporting the jaw means for pivotal movement upon actuation, sliding means mounted for sliding movement on which the support means is secured for enabling linear movement of the support means and the jaw means upon actuation, a single actuator having a determined movement, and means connecting the actuator to the support means and to the sliding means for actuating either the support means or the sliding means and means causing for any portion of the determined movement of the actuator either a pivotal movement of the jaw means by the support means or a linear movement of the jaw means by the sliding means depending on which movement has a lesser resistance to movement.

2. A transferring mechanism for a workpiece comprising jaw means adapted to grasp and release a workpiece, support means for supporting the jaw means for pivotal movement upon actuation, sliding means mounted for sliding movement on which the support means is secured for enabling linear movement of the support means and the jaw means upon actuation, normal position means urging the sliding means to a normal position intermediate the limits of its movement and resisting movement therefrom, a single actuator having a determined movement, means connecting the actuator to the support means and to the sliding means for actuating either the support means or the sliding means for each portion of movement of the actuator, said actuator causing pivotal movement of the jaw means by said support means when the resistance to pivotal movement is less than the resistance to movement of the sliding means caused by the normal position means and causing linear movement of the sliding means when its resistance to sliding movement is less than the resistance of the jaw means to pivotal movement to thereby linearly and pivotally move the jaw means.

3. A transferring mechanism for a workpiece comprising jaw means adapted to grasp and release a workpiece, support means for supporting the jaw means for pivotal movement upon actuation, sliding means mounted for sliding movement on which the support means is secured for enabling linear movement of the support means and jaw means upon actuation, normal position means urging the sliding means to a normal position intermediate the limits of its movement and resisting movement therefrom, a single actuator having a determined movement, means connecting the actuator to the support means and to the sliding means for actuating either the support means or the sliding means for each portion of movement of the actuator, said actuator causing pivotal movement of said support means when the sliding means is at its normal position and for causing linear movement of the sliding means towards its normal position when it is away from its normal position to thereby linearly and pivotally move the jaw means.

4. A transferring mechanism for a workpiece comprising jaw means adapted to grasp and release a workpiece, support means for supporting the jaw means for pivotal movement as a unit between two extreme positions upon actuation, stop means engageable with the jaw means for setting the two extreme positions of pivotal movement, sliding means mounted for sliding movement on which the support means is secured for enabling linear movement of the support means and jaw means upon actuation, normal position means urging the sliding means to a normal position intermediate the limits of its movement and resisting movement therefrom, a single actuator having a determined position and means connecting the actuator to the support means and to the sliding means for actuating either the support means or the sliding means for each portion of movement of the actuator, said actuator for a determined movement effecting only linear movement of the sliding means against the resistance of the normal position means when the jaw means is at one or the other of its extreme positions.

5. The invention as defined in claim 2 in which the normal position means includes at least one spring and deviation of the sliding means from its normal position alters the condition of the spring from its condition at the normal position.

6. The invention as defined in claim 2 in which the actuator is a reciprocating gear rack that reciprocates linearly parallel to the linear movement of the sliding means.

7. The invention as defined in claim 1 in which the workpiece has a shank, the jaw means includes a pair of jaws pivotally mounted and spring urged to a closed position, said jaws being formed to have a shank encircling cutout and a camming surface leading to said cutout, whereby when said jaws are forced against the shank by the linear movement of the jaw means the shank forces the jaws to initially open to permit the shank to be received within the cutout.

References Cited by the Examiner

UNITED STATES PATENTS

| | | |
|---|---|---|
| 2,794,563 | 6/57 | Daines _____ 214—146.5 |
| 2,832,478 | 4/58 | Malewicz. |
| 2,925,183 | 2/60 | Eastus. |
| 3,104,765 | 9/63 | Campbell. |

HUGO O. SCHULZ, *Primary Examiner.*